US008318261B2

(12) United States Patent
Toma et al.

(10) Patent No.: US 8,318,261 B2
(45) Date of Patent: Nov. 27, 2012

(54) THERMALLY SPRAYED $Al_2O_3$ COATINGS HAVING A HIGH CONTENT OF CORUNDUM WITHOUT ANY PROPERTY-REDUCING ADDITIVES, AND METHOD FOR THE PRODUCTION THEREOF

(75) Inventors: Filofteia-Laura Toma, Dresden (DE);
Lutz-Michael Berger, Dresden (DE);
Carl Christoph Stahr, Kahl am Main (DE); Tobias Naumann, Dresden (DE);
Stefan Langner, Dresden (DE)

(73) Assignee: Fraunhofer-Gesellschaft zur Foerderung der Angewandten Forschung E.V. (DE)

( * ) Notice: Subject to any disclaimer, the term of this patent is extended or adjusted under 35 U.S.C. 154(b) by 0 days.

(21) Appl. No.: 12/995,369

(22) PCT Filed: May 28, 2009

(86) PCT No.: PCT/EP2009/003797
§ 371 (c)(1),
(2), (4) Date: Feb. 2, 2011

(87) PCT Pub. No.: WO2009/146832
PCT Pub. Date: Dec. 10, 2009

(65) Prior Publication Data
US 2011/0123431 A1    May 26, 2011

(30) Foreign Application Priority Data
May 30, 2008   (DE) .................. 10 2008 026 101

(51) Int. Cl.
*C04B 35/00* (2006.01)

(52) U.S. Cl. .................. 427/453; 427/454; 423/625
(58) Field of Classification Search .............. 427/446, 427/454, 453; 423/625
See application file for complete search history.

(56) References Cited

U.S. PATENT DOCUMENTS

| 3,812,055 | A | * | 5/1974 | Carstens et al. | ............ 516/93 |
| 4,487,841 | A | | 12/1984 | Bartuska et al. | ............ 501/105 |
| 5,609,921 | A | | 3/1997 | Gitzhofer et al. | ............ 427/446 |
| 6,447,848 | B1 | | 9/2002 | Chow et al. | ............ 427/446 |
| 6,579,573 | B2 | * | 6/2003 | Strutt et al. | ............ 427/452 |

(Continued)

FOREIGN PATENT DOCUMENTS
DE        30 12 515        10/1981
(Continued)

OTHER PUBLICATIONS
International Search Report and Written Opinion dated Oct. 2, 2009 (15 pgs).
(Continued)

*Primary Examiner* — Steven Bos
(74) *Attorney, Agent, or Firm* — Hayes Soloway P.C.

(57) ABSTRACT

The disclosure provides a method of producing thermally sprayed $Al_2O_3$ coatings having a high content of corundum without any property-reducing additives. The coatings may be utilized particularly in the field of electrical insulation, as a dielectric, and as protection from wear. The thermally sprayed $Al_2O_3$ coatings have a porosity of no more than 19%, and a high content of $\alpha$-$Al_2O_3$ (content of corundum) of at least 72% by volume. The coatings have a specific electrical resistance of $>1 \cdot 10^{12}$ Ohms·cm, and a purity of >97%. The production of said coatings is carried out utilizing aqueous or alcoholic suspensions made from substantially pure $\alpha$-$Al_2O_3$, having a grain size of >100 nm by thermal spraying.

9 Claims, 1 Drawing Sheet

SEM micrograph of an $\alpha$-$Al_2O_3$ coating prepared by HVOF suspension spraying.

U.S. PATENT DOCUMENTS

| | | | |
|---|---|---|---|
| 2003/0077398 A1* | 4/2003 | Strutt et al. | 427/452 |
| 2006/0216430 A1* | 9/2006 | Deng et al. | 427/456 |
| 2006/0289405 A1 | 12/2006 | Oberste-Berghaus et al. | 219/121.47 |
| 2008/0090071 A1* | 4/2008 | Valle et al. | 428/336 |
| 2009/0123362 A1* | 5/2009 | Roesch | 423/625 |

FOREIGN PATENT DOCUMENTS

| | | | |
|---|---|---|---|
| DE | 33 10 650 | | 3/1984 |
| EP | 0 621 079 | | 10/1994 |
| GB | 2 073 169 | | 10/1981 |
| WO | WO 2006/043006 | | 4/2006 |
| WO | WO 2006/116844 | | 11/2006 |
| WO | 2007009659 | * | 1/2007 |

OTHER PUBLICATIONS

McPherson, "Formation of metastable phases in flame- and plasma-prepared alumina", Departement of Materials Engineering, Journal of Materials Science 8 (1973) pp. 851-858.

Stahr et al., "Dependence of the Stabilization of $\alpha$-Alumina on the Spray Process", Journal of Thermal Spray Technology vol. 16, Dec. 2007, pp. 822-830.

Swindeman et al., "An Investigation of the Electrical Behavior of Thermally-Sprayed Aluminum Oxide", Proceedings of the National Thermal Spray Conference, Ohio, Oct. 7-11, 1996.

Berghaus-Oberste, et al., "Thermal Spraying of Basalt for Abrasion Protective Coatings using WSP, HVOF, and APS", Proceedings of International Spray Conference 2005 (Abstract only).

* cited by examiner

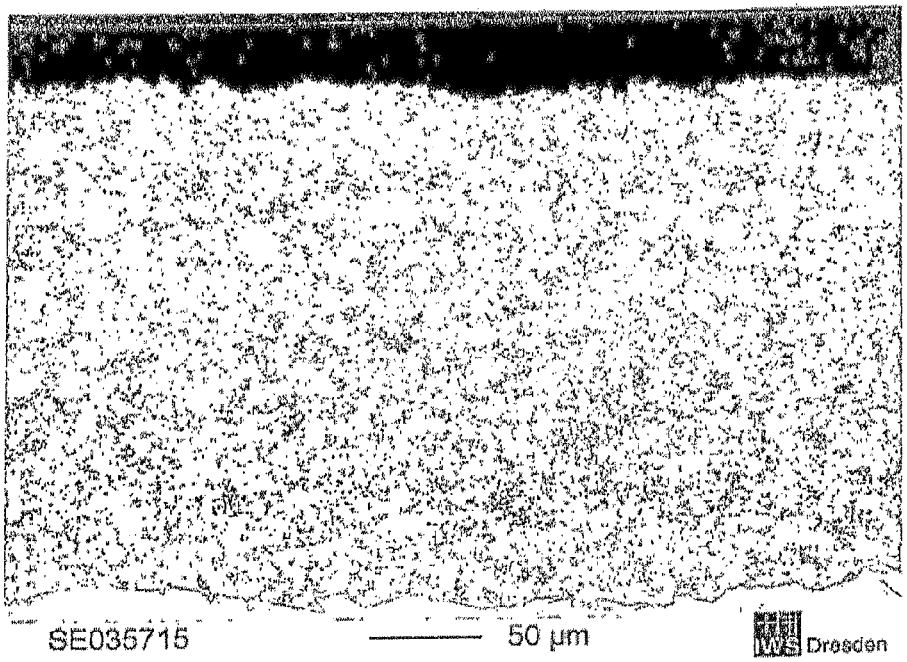
SEM micrograph of an α-Al₂O₃ coating prepared by HVOF suspension spraying.

THERMALLY SPRAYED $AL_2O_3$ COATINGS HAVING A HIGH CONTENT OF CORUNDUM WITHOUT ANY PROPERTY-REDUCING ADDITIVES, AND METHOD FOR THE PRODUCTION THEREOF

The invention relates to thermally sprayed aluminum oxide coatings having a low porosity and a high $\alpha$-$Al_2O_3$ (corundum) content without any property-reducing additives. The coatings may be produced from aqueous or alcoholic suspensions with dispersed $\alpha$-$Al_2O_3$ particles >100 nm in size using various thermal spraying methods. The present invention effectively improves the properties of thermally sprayed aluminum oxide coatings. Their use is especially advantageous because of the high $\alpha$-$Al_2O_3$ content in components which require improved electrical insulation and an improved wear resistance. The corrosion properties of the coatings and thus the stability in aggressive media are improved. In addition, the high-temperature stability is improved because the changes in volume due to the phase transition are greatly reduced. The long-term stability of the properties is improved due to the reduced reaction of the coatings with atmospheric humidity.

Thermally sprayed aluminum oxide coatings have a high technical importance and are manufactured from aluminum oxide feedstock powders usually by atmospheric plasma spraying (APS) but also by other methods from the thermal spray process group such as high-velocity oxygen fuel spraying (HVOF). These coatings are used primarily for wear protection, electrical insulation and as a dielectric. Whenever these thermally sprayed $Al_2O_3$ coatings are used—regardless of the method of preparation, this is associated with the typical properties of sintered $Al_2O_3$ ceramics (high melting point, high electric resistance up to high temperatures, very good mechanical properties and extensive chemical stability). However, an important difference in comparison with sintered $Al_2O_3$ is that sprayed coatings are comprised of different forms (modifications) of the $Al_2O_3$ and this is the case despite the fact that the starting material is usually pure, thermodynamically stable corundum ($\alpha$-$Al_2O_3$ phase). Almost all coatings consist predominantly of transition aluminas (including the $\gamma$ phase) in the layer. This well-known behavior, which is characteristic of aluminum oxide, was described in detail for the first time by McPherson (J. Mater. Sci. 8 (1973) 6, 851-858) and later was also described by Müller and Kreye (Schweissen and Schneiden [Welding and Cutting] 53 (2001) 6, 336-345). According to DE 33 10 650, a conversion back to $\alpha$-$Al_2O_3$ can be achieved by a laborious additional procedural step such as rewelding by means of electron beam or laser beam. However, thermally sprayed coatings are currently being manufactured and used while just accepting the conversion of $\alpha$-$Al_2O_3$ to predominantly transition alumina. Therefore, the mechanical and electrical properties in particular do not reach the excellently levels of the properties of sintered corundum in particular. Differences compared with sintered material include mainly the possible water uptake when used in humid atmospheres and the low mechanical and electrical insulation properties. An improvement in the properties of these coatings is urgently needed for many existing applications as well as new applications currently under development.

A reconversion of the phases in the layer back to $\alpha$-$Al_2O_3$ can be accomplished by a heat treatment at 1200° C. or higher. Due to the very high temperatures, this is unsuitable for coatings on metallic substrates in particular. In addition, due to the phase transition there are great changes in volume which result in defects in the coatings. To suppress the phase transition in the spraying process, various additives, usually $Cr_2O_3$ can be mechanically mixed with the $\alpha$-$Al_2O_3$. For this case the stabilization of the $\alpha$ phase depends on the spray process used and is successful only with the less popular water stabilized plasma spraying (WSP). Another approach is to use feedstock powders consisting of solid solutions. It is effective to use, for example, $Al_2O_3$—$Cr_2O_3$ mixed crystals (C. C. Stahr, S. Saaro, L.-M. Berger, J. Dubsky, K. Neufuss, M. Hermann, J. Thermal Spray Technology 18 (2007) 5-6, 822-830). In any case, these additives also cause a decrease in properties in comparison with pure corundum.

In recent years, process variants using suspension made of nanoscale powders or solutions of organic and inorganic substances are used as the starting material instead of coating powders. One advantage of this process variant is that it avoids the use of complex process steps in preparing the feedstock powder. The use of suspensions is known for the APS method (WO 2006/043006 A1), inductive plasma spraying (U.S. Pat. No. 5,609,921) or HVOF (DE 10 2005 0380 453 A1).

Among other, there have also been known studies in the preparation of aluminum oxide coatings from suspensions. By using a suspension containing 10 wt % $\alpha$-$Al_2O_3$ (grain size 27-43 nm), coatings consisting mainly of $\alpha$-$Al_2O_3$ and a small amount of $\gamma$-$Al_2O_3$ but having a high open porosity and a low cohesion in the layer have been produced (J. Oberste-Berghaus, S. Bouaricha, J.-G. Legoux, C. Moreau, Proceedings of the International Thermal Spray Conference 2005—Thermal Spray Connects: Explore Its Surfacing Potential, Basel, Switzerland (2005), CD ROM version). Another article describes a very high percentage of $\alpha$-$Al_2O_3$ in coatings produced from an alcoholic suspension of nanoscale $\alpha$-$Al_2O_3$ particles (50-300 nm produced by heat treatment of $\gamma$-$Al_2O_3$) (Z. Chen et al., J. Mater. Sci. 39 (2004) 13, 4171-4178). However, this layer consists only of the particles that are sintered together and lack the lamellar structure that is characteristic of sprayed coatings. No information is given about porosity and can be from the description of the coatings in the paper it can be concluded that they have a high porosity and would not be of any practical value.

Preparation of aluminum oxide coatings having a high $\alpha$-$Al_2O_3$ content with an acceptable porosity has not yet been successful. This is proven by US 2006/0289405 A1, paragraphs 0045-0047, where coatings produced by suspension spraying are described. The layer consisted of 88% $\gamma$-$Al_2O_3$ with a porosity of 11% and was prepared from an alcoholic suspension of $\alpha$-$Al_2O_3$ particles (10 wt %) with a grain size of 29-68 nm.

According to US Patent 2002/6,447,848 B1 (Table 2), coatings consisting of $\gamma$-$Al_2O_3$ are obtained from a powder having a grain size of 35 nm.

The object of the present invention now is to propose aluminum oxide coatings for practical use having low porosity and a high $\alpha$-$Al_2O_3$ content without the use of property-reducing additives. Therefore, the mechanical, electrical (insulation) and corrosive properties of the aluminum oxide coatings are effectively improved. These coatings have a high long-term stability of their properties when used in a humid atmosphere. This object is to be achieved without any additional heat treatment of the coatings.

At the same time, the object of the invention is to provide a method for manufacturing the inventive $Al_2O_3$ coatings.

The inventive thermally sprayed aluminum oxide coatings have a high $\alpha$-$Al_2O_3$ content (corundum content) of at least 72 vol % and a porosity of max. 19%. These coatings preferably contain at least 80 vol % $\alpha$-$Al_2O_3$ and have a maximum porosity of 10%. The $\alpha$-$Al_2O_3$ content is detected by X-ray phase analysis and the porosity is determined by image analysis. The coatings advantageously have a resistivity of $>1\times10^{12}$ ohm·cm. These coatings preferably have a specific electric resistivity of $>1\times10^{13}$ ohm·cm. The purity of the coatings is influenced mainly by the starting powder used. In the worst case, the aluminum oxide may be contaminated in the spray process. The coatings advantageously have a purity of at least 97%. The coatings preferably have a purity of at least 99%.

Due to the high corundum content and the low porosity, the coatings have a very high long-term stability, in particular with regard to their electrical and mechanical properties when used in a humid environment. This long-term stability of properties is advantageously achieved in air with a relative atmospheric humidity at 50%. Advantageously, this long-term stability of properties is also achieved in air with an atmospheric humidity of 70%.

Likewise, according to the invention, these aluminum oxide coatings are produced by suspension spraying from an aqueous or alcoholic suspension of pure $\alpha$-$Al_2O_3$ with a grain size of $>100$ nm. In principle, a suspension of pure $\alpha$-$Al_2O_3$ from a mixture of water and alcohol may also be used. Pure $\alpha$-$Al_2O_3$ with a grain size of $>400$ nm is preferably used to prepare the aqueous or alcoholic suspension. The suspension advantageously has a low viscosity of <1 mPa·s. For a high stability, a pH of 3 to 5 is established in the case of aqueous suspensions.

The coatings are produced by a method from the thermal spraying group. Atmospheric plasma spraying (APS) is preferably used for certain applications. In addition, high-velocity oxygen fuel spraying (HVOF) may preferably also be used for other applications.

The $\alpha$-$Al_2O_3$ content in the layer can be increased by various methods of process engineering while maintaining a constant low porosity. These methods include optimization of the plasma gas composition in APS and optimization of the oxygen/fuel ratio in HVOF, the spraying distance, the relative velocity of the spray gun with respect to the substrate and the feed rate of suspension. Relatively thin coatings of <20 μm can be produced by simply passing over the substrate by using suspension spraying in comparison with methods using feedstock powder or granules as the starting material. The layer thickness can be regulated by the number of passes or the change in feed rate. Inventive coatings with thicknesses >100 μm are easy to produce in the case of multiple transitions.

An $\alpha$-$Al_2O_3$ powder of a high purity is advantageously used for the suspensions. The purity of the $\alpha$-$Al_2O_3$ powder amounts to at least 98% (advantageously, at least 99.8%). The suspension is sprayed with a focused jet through an injector into the plasma jet or into the HVOF flame.

For the aqueous or alcoholic suspension, a solids content of up to 25 wt % is advantageously used.

According to the invention, the high $\alpha$-$Al_2O_3$ content in the coatings is produced without any additional heat treatment.

Because of the high $\alpha$-$Al_2O_3$ content, use of the coatings according to the invention is especially promising for electrical insulation, as a dielectric and as a wear-resistant and corrosion-resistant layer. The coatings can be used at higher temperatures than the temperature of the phase transition due to their better high-temperature stability. Due to the reduced reaction of the coatings with atmospheric humidity, the long-term stability of their properties is excellent.

The coatings according to the invention are to be described in greater detail in the following examples of embodiments.

EXAMPLE 1

An $\alpha$-$Al_2O_3$ powder (purity >99.8% $Al_2O_3$) with the commercial designation A-16SG (from the company Almatis GmbH, Germany) and having a grain size of $d_{50}=0.4$ μm ($d_{90}=1.5$ μm) was used as the starting material. An aqueous suspension (25 wt %) was prepared with distilled water, its pH of 4 being established by using an aqueous solution of 10% HCl. The suspension was stirred magnetically for the first 15 minutes, then placed in an ultrasonic bath for 10 minutes and next stirred again magnetically to prevent the agglomeration of particles in the suspension and to improve the homogeneity. The suspension prepared in this way is characterized by a very low viscosity (<1 mPa·s). The suspension was introduced into the combustion chamber of an HVOF system (Top Gun, GTV mbH, Germany, 8 mm nozzle) by way of a pressure container (Krautzberger GmbH, Germany) at a pressure of 0.5 MPa by injection with the help of a 0.25 mm nozzle. These experiments were conducted using ethene as the fuel gas (60 L/min) and oxygen (165/Lmin [sic; 165 L/min]). Steel/stainless steel substrates roughened by sandblasting (3 bar pressure) immediately before spraying were used. The spray distance was 110 mm.

Layer thicknesses of 230 μm were obtained in this way. An SEM microstructure of the layer is shown in FIG. 1. The porosity of the coating is determined by image analysis with the help of the ScionImage software from NIMH (National Institute of Mental Health USA). The porosity of the coating was calculated as 7.5%. By X-ray phase analysis, 74 vol % $\alpha$-$Al_2O_3$ phase was detected in the sprayed coatings. The resistivity of this layer was $1.2\times10^{13}$ ohm·cm.

EXAMPLE 2

An aqueous suspension like that in Example 1 was injected radially through a 0.3 mm injector into the plasma jet of an atmospheric plasma spray system (APS, 6 mm nozzle, GTV mbH Germany). This injector is adjusted at an angle of 15° to the horizontal axis of the plasma flame outside of the plasma gun. The suspension is injected at a pressure of 0.2 MPa. The plasma power was 55 kW, using as the plasma gases a gas mixture of argon (40 L/min) and hydrogen (10 L/min). The spray distance was 60 mm. The layer (150 μm thickness) had a porosity of 8.5% and an $\alpha$-$Al_2O_3$ phase content of 80 vol %. The resistivity of this layer was $2.9\times10^{12}$ ohm·cm.

EXAMPLE 3

In this case, an alcoholic suspension containing 20 to 25 wt % starting powder from Example 1 in ethanol was used. To increase the stability of the suspension, 2 wt % per powder weight of an organic dispersant aid (KV9056 Zschimmer & Schwarz, Germany) was used. The dispersion and the homogeneity of the suspension were improved by using an ultrasonic bath and a magnetic stirrer. The suspension was sprayed with APS. The plasma power was 38 kW, using argon (40 L/min) and hydrogen (6 L/min) as plasma gases. The spray distance was 50 mm. The coatings (>110 μm thickness) had a porosity of 19%. By X-ray phase analysis 72 vol % $\alpha$-$Al_2O_3$ phase was detected. The resistivity of this layer was $1.4\times10^{12}$ ohm·cm.

EXAMPLE 4

A suspension like that in Example 3 was used. The suspension was sprayed with APS. The plasma power was 51 kW using argon (60 L/min) and helium (25 L/min) as the plasma gases. The coatings (>160 μm thick) had a porosity of 11.5%. By X-ray analysis 76 vol % $\alpha$-$Al_2O_3$ phase was detected.

All the disadvantages of the state of the art were eliminated with the $Al_2O_3$ coating according to the invention and the method for producing same.

The invention claimed is:

1. A method for producing a thermally sprayed $Al_2O_3$ coating, comprising the introduction of an aqueous or alcoholic suspension of substantially pure $\alpha\text{-}Al_2O_3$ powder having a grain size of greater than 100 nm into a thermal spray process, to produce a coating having a maximum porosity of 19% and an $\alpha\text{-}Al_2O_3$ content of at least 72 vol. %.

2. The method according to claim 1, wherein an aqueous or alcoholic suspension of substantially pure $\alpha\text{-}Al_2O_3$ having a grain size of greater than 400 nm is introduced into a thermal spray process.

3. A method according to claim 1, wherein the thermal spray process comprises an atmospheric plasma spray process.

4. The method according to claim 1, wherein the thermal spray process comprises a high-velocity oxygen fuel spray process.

5. The method according to claim 1, wherein the substantially pure $\alpha\text{-}Al_2O_3$ powder in the suspension has a purity of at least 98%.

6. The method according to claim 5, wherein the substantially pure $\alpha\text{-}Al_2O_3$ powder in the suspension has a purity of at least 99.8%.

7. The method according to claim 1, wherein the solids content in the aqueous or alcoholic suspension is adjusted to up to 25 wt %.

8. A method according to claim 2, wherein the thermal spray process comprises an atmospheric plasma spray process.

9. The method according to claim 2, wherein the thermal spray process comprises high-velocity oxygen fuel spraying.

* * * * *